Oct. 25, 1938.    J. STEIN    2,134,537
ESTERIFICATION PROCESS
Filed Jan. 30, 1936
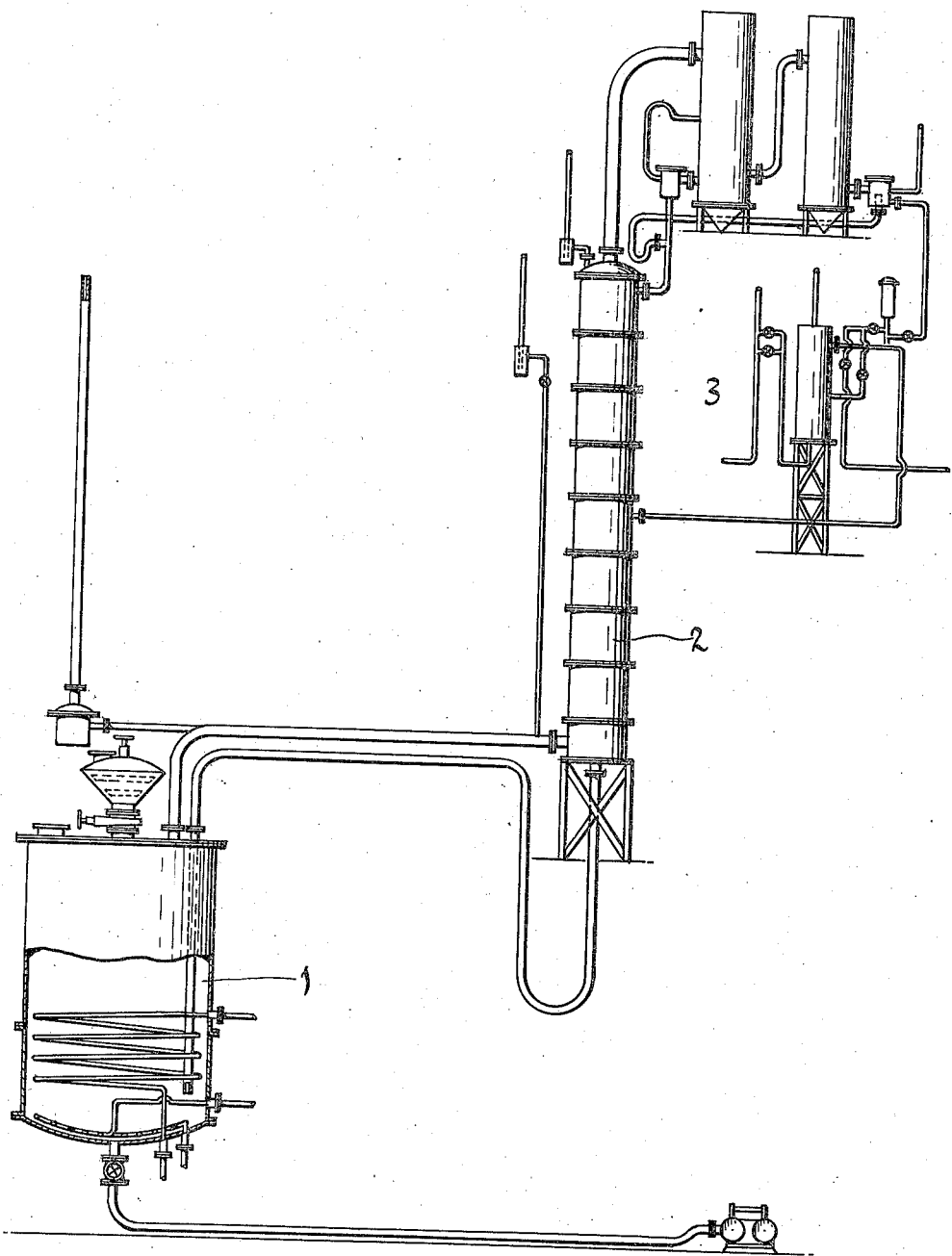
INVENTOR.
Jacob Stein,
BY
ATTORNEY.

Patented Oct. 25, 1938

2,134,537

UNITED STATES PATENT OFFICE 2,134,537

ESTERIFICATION PROCESS

Jacob Stein, Philadelphia, Pa., assignor to Publicker Inc., Philadelphia, Pa., a corporation of Delaware Application January 30, 1936, Serial No. 61,507

6 Claims. (Cl. 260—488)

My invention relates to a certain new and useful method or process of making aliphatic esters as for instance, butyl acetate; amyl acetate; butyl propionate; amyl propionate; butyl butyrate; hexyl acetate; heptyl acetate, and the like, whereby the entire process can be carried out in a single vessel without removal or transfer to other vessels for different steps in the course of manufacture, and whereby a product of a high degree of purity may be obtained from almost equi-molecular amounts of alcohol and acid and with the use of much smaller amount of catalyst (such as sulphuric acid) than ordinarily employed.

One of the objects of my present invention is to simplify and to reduce the cost of the manufacture of aliphatic esters, as for instance, butyl acetate, and to increase the purity of the resultant product and also to minimize the amount of equipment necessary for the manufacture of such aliphatic esters.

With the above and other objects in view which will appear more fully from the following detailed description, my invention consists in heating in a distilling kettle, a mixture of the acid and alcohol in the presence of a small amount of catalyst such as sulphuric acid, until esterification has been completed, and then continuing to heat and thus to distill off a constant boiling mixture of ester (butyl acetate for instance), alcohol and water into a separating tank wherein this constant boiling mixture is permitted to separate into two layers with the only ester layer on top and the water on the bottom, and permitting the top ester layer to decant and to return to the distilling kettle, and continuing this removal by distillation of the constant boiling mixture, the separation by settling of the water, and the return of the water-deleted ester until the bulk of the water has been removed from the reaction mixture; then adding directly to the reaction mixture a predetermined amount of a special light fluffy soda ash in an amount somewhat in excess of the theoretical amount required to neutralize the acid present, and then refluxing the neutralized ester and then finally distilling the finished product.

My invention further consists of other novel features and details which will appear more fully from the following detailed description.

For the purpose of illustrating my invention, I have shown in the accompanying drawing one form of apparatus which is suitable in the practice of my invention, although it is to be understood that the various instrumentalities of which this apparatus consists can be variously arranged and organized and that my invention is not limited to the precise arrangement and organization of the instrumentalities as herein shown and described.

In the accompanying drawing, I have shown a diagram illustrating schematically the successive steps of my method and the convenient form of apparatus which may be used in carrying out my process.

To illustrate a specific mode of carrying out my invention, I may charge into a distilling kettle, glacial acetic acid, or any commercial acetic acid of approximately not less than 90% acetic acid content, and generally dry butyl alcohol in the proportions of approximately $1\frac{1}{10}$ (1.1) to $1\frac{2}{10}$ (1.2) mols of butyl alcohol to 1 mol. of acetic acid. To this mixture, an amount of sulphuric acid, as a catalyst, is added in the ratio of approximately not more than $\frac{2}{10}$ of 1% (0.20%) nor approximately not less than $\frac{5}{100}$ of 1% (0.05%) by weight, of the total liquid in the kettle.

Heat is then applied to the kettle, and a constant boiling mixture of butyl acetate and water is removed as a distillate through a suitable fractionating column 2 operatively connected with the distilling kettle, said constant boiling mixture being condensed into (or condensed and conveyed to) a suitable separator 3 where the condensed constant boiling mixture is permitted to settle and separate into an upper ester layer and a lower water layer, and from which the ester layer is decanted and returned to the distilling kettle. This cycle is continued until the bulk of the water of the reaction mixture is thus removed from the reaction, and the esterification completed. This may require twenty-four to thirty-six hours, more or less.

While the resultant product in the distilling kettle is still hot and, in fact, without turning off the heat (the steam), a finely comminuted and flocculent special light-fluffy soda ash is added directly to the hot ester in the distilling kettle, in an amount somewhat greater than the theoretical amount required to neutralize the acid present in the ester. In practice, this may be as much as twice the theoretical amount. For instance, to a thousand gallons of the crude ester after the esterification and water removal process, I may add approximately 150 pounds of this finely divided fluffy soda ash. The soda ash used for this purpose is a special soda ash characterized by its tendency to occupy a relatively large volume (compared to its weight) when immersed in a non-solvent and inert liquid. Thus, for instance, the soda ash employed by me is almost entirely free of water, and is of such fine degree of division that about half (more or less) will pass through a 150-mesh (Tyler standard) screen, while about a third will pass through a 200-mesh screen. Thus, a characteristic screen analysis on Tyler standard screens may be more or less as follows:

| | Per cent |
|---|---|
| On 32-mesh | 1.76 |
| On 42-mesh | 1.86 |
| On 60-mesh | 3.66 |
| On 80-mesh | 8.34 |
| On 100-mesh | 10.38 |
| On 150-mesh | 17.22 |
| On 200-mesh | 23.66 |
| Through 200-mesh | 33.12 |
| Total | 100.00 |

In addition to the foregoing, however, the soda ash employed by me is further characterized by the tendency towards large bulk both in the dry state as well as when suspended in inert liquids in which it is not soluble. Thus, for instance, a hundred grams of this soda ash mixed with 200 c. c. of a non-solvent, as for instance, butyl acetate, will occupy from approximately 27 to approximately 31 c. c. when fully settled after being permitted to stand approximately two hours in a quiescent state.

Upon the addition of this fluffy soda ash, the ester is further heated and re-fluxed for a period of approximately 1 to 3 hours, and the acidity again determined, and if the ester is found to be neutral, it is distilled as a finished product.

The last distillation, in the presence of the soda ash, permits not only the neutralization of the acid, but also the removal of color, and permits of a fractionation of the ester content desired for the final product.

To add the light fluffy soda ash without stopping the operation or without shutting off the heat from the distilling kettle, I may provide an auxiliary reservoir on top of the kettle and in communicable relation thereto, having a suitable valve or trap door intermediate thereof and the distilling kettle, and having a suitable lid or closure;—into which the light fluffy soda ash may be introduced while the valve of the trap door is closed, and from which the light fluffy soda ash may be dropped into the distilling kettle when the water removal and esterification has been completed by closing its lid or closure and opening the valve or trap door intermediate thereof and the distilling kettle.

Having thus described the invention, what is hereby claimed as new and desired to be secured by Letters Patent is:

1. The process of making butyl acetate, which consists in heating a mixture of butyl alcohol and acetic acid of high concentration, in more or less equi-molecular proportions, in the presence of a small amount of a catalyst in a vessel suitable for subsequent distillation, to effect an esterification of the reaction mixture, then further heating the thus esterified mixture and distilling off a constant boiling mixture of butyl acetate and water into a separating vessel, permitting the resultant distillate to separate into layers, one of which is preponderately butyl acetate and another one of which is preponderately water, returning the butyl acetate layer to the first mentioned vessel and continuing this distillation of a constant boiling mixture and the return of butyl acetate until a substantial part of the water is removed from the reaction mixture, then adding directly to the water-deleted product a light fluffy soda ash in an amount somewhat in excess of the theoretical amount required to neutralize the acid present, and then distilling the butyl acetate.

2. The process of making butyl acetate, which consists in heating a mixture of butyl alcohol and acetic acid of high concentration in more or less equi-molecular proportions, in the presence of a small amount of a catalyst in a vessel suitable for subsequent distillation, to effect an esterification of the reaction mixture, then further heating the thus esterified mixture and distilling off a constant boiling mixture of butyl acetate and water into a separating vessel, permitting the resultant distillate to separate into layers, one of which is preponderately butyl acetate and another one of which is preponderately water, returning the butyl acetate layer to the first mentioned vessel and continuing this distillation of a constant boiling mixture and the return of butyl acetate until a substantial part of the water is removed from the reaction mixture, then adding directly to the water-deleted product a light fluffy soda ash in an amount somewhat in excess of the theoretical amount required to neutralize the acid present, then refluxing the neutralized butyl acetate, and then distilling the butyl acetate.

3. The process of making an ester, which consists in heating a mixture of an alcohol and a carboxylic acid of high concentration in more or less equi-molecular proportions, in the presence of a small amount of a catalyst in a vessel suitable for subsequent distillation, to effect an esterification of the reaction mixture, then further heating the thus esterified mixture and distilling off a constant boiling mixture of the resultant ester and water into a separating vessel, permitting the resultant distillate to separate into layers, one of which is preponderately the ester and another one of which is preponderately water, returning the ester layer to the first mentioned vessel and continuing this distillation of a constant boiling mixture and the return of ester until a substantial part of the water is removed from the reaction mixture, then adding directly to the water-deleted product a light fluffy soda ash in an amount somewhat in excess of the theoretical amount required to neutralize the acid present, and then distilling the ester.

4. The process of making an ester which consists in heating a mixture of an alcohol and a carboxylic acid of high concentration in more or less equi-molecular proportions, in the presence of a small amount of a catalyst in a vessel suitable for subsequent distillation, to effect an esterification of the reaction mixture, then further heating the thus esterified mixture and distilling off a constant boiling mixture of the resultant ester and water into a separating vessel, permitting the resultant distillate to separate into layers, one of which is preponderately the ester and another one of which is preponderately water, returning the ester layer to the first mentioned vessel and continuing this distillation of a constant boiling mixture and the return of ester until a substantial part of the water is removed from the reaction mixture, then adding directly to the water-deleted product a light fluffy soda ash in an amount somewhat in excess of the theoretical amount required to neutralize the acid present, then refluxing the neutralized ester, and then distilling the ester.

5. In the preparation of an aliphatic ester by heating an alcohol with a carboxylic acid in a distilling kettle and then distilling the ester, the steps comprising neutralizing the substantially non-aqueous material in the distilling kettle by the direct addition thereto after esterification is substantially complete, of an excess of light fluffy soda ash, and distilling the material in the kettle and passing the vapors through a fractionating column to separate the ester fraction and to decolorize it.

6. In the preparation of an aliphatic ester by heating an alcohol with a carboxylic acid in a distilling kettle and then distilling the ester, the steps comprising neutralizing the substantially non-aqueous material in the distilling kettle by the direct addition thereto after esterification is substantially complete, of an excess of light fluffy soda ash, refluxing the material in the distilling kettle for from one to three hours, and distilling the material in the kettle and passing its vapor through a fractionating column to separate the ester fraction and to decolorize it.

JACOB STEIN.